US008793054B2

(12) United States Patent
Sjögren et al.

(10) Patent No.: US 8,793,054 B2
(45) Date of Patent: Jul. 29, 2014

(54) SYSTEM AND A METHOD OF CONTROLLING THE TILTING OF A LOADCARRYING IMPLEMENT OF A MOVABLE WORK MACHINE, AND A MOVABLE WORK MACHINE

(75) Inventors: Joakim Sjögren, Köping (SE); Bo Vigholm, Stora Sundby (SE); Gunnar Löwestrand, Malmköping (SE)

(73) Assignee: Volvo Construction Equipment AB, Eskilstuna (SE)

( * ) Notice: Subject to any disclaimer, the term of this patent is extended or adjusted under 35 U.S.C. 154(b) by 1336 days.

(21) Appl. No.: 11/917,001

(22) PCT Filed: Jun. 22, 2005

(86) PCT No.: PCT/SE2005/000999

§ 371 (c)(1), (2), (4) Date: Dec. 9, 2007

(87) PCT Pub. No.: WO2006/137761

PCT Pub. Date: Dec. 28, 2006

(65) Prior Publication Data

US 2008/0213075 A1 Sep. 4, 2008

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |

(52) U.S. Cl.

USPC ...................... 701/50; 701/1; 701/36; 701/49

(58) Field of Classification Search

USPC ....................... 701/50, 1, 36, 49; 414/222.01, 414/331.01–331.06, 334, 340, 349, 354, 414/373, 444

See application file for complete search history.

(56) References Cited

U.S. PATENT DOCUMENTS

| | | | | |
|---|---|---|---|---|
| 1,975,252 | A | 10/1934 | Clark | |
| 4,143,782 | A * | 3/1979 | Dengler | 414/672 |
| 4,491,918 | A * | 1/1985 | Yuki et al. | 701/50 |
| 5,165,838 | A * | 11/1992 | Kallansrude et al. | 414/471 |
| 6,175,796 | B1 * | 1/2001 | Ishikawa | 701/50 |
| 6,266,594 | B1 * | 7/2001 | Ishikawa | 701/50 |
| 6,385,518 | B1 * | 5/2002 | Rickers et al. | 701/50 |
| 6,611,746 | B1 * | 8/2003 | Nagai | 701/50 |

(Continued)

FOREIGN PATENT DOCUMENTS

| | | |
|---|---|---|
| JP | 10338493 A | 12/1998 |
| WO | 9916698 A1 | 4/1999 |

OTHER PUBLICATIONS

International Search Report for corresponding International Application PCT/SE2005/000999.

*Primary Examiner* — Rami Khatib
(74) *Attorney, Agent, or Firm* — WRB-IP LLP

(57) ABSTRACT

A system is provided for controlling the tilting of a load-carrying implement of a movable work machine that includes a frame and the implement, pivotally connected to the frame, and a tilting arrangement for tilting the implement in relation to the frame. The system includes a control for controlling the tilting of the implement based upon a sensor-registered movement of the movable work machine, and for controlling the tilting of the implement such that the implement counteracts the inertia of a load carried by the implement.

15 Claims, 2 Drawing Sheets

(56) References Cited

U.S. PATENT DOCUMENTS

| | | | | |
|---|---|---|---|---|
| 6,616,400 | B1 * | 9/2003 | Caponey | 414/809 |
| 7,093,383 | B2 * | 8/2006 | Mennen et al. | 37/348 |
| 7,216,024 | B1 * | 5/2007 | Abels et al. | 701/50 |
| 7,524,268 | B2 * | 4/2009 | Oka et al. | 477/169 |
| 2005/0102081 | A1 * | 5/2005 | Patterson | 701/50 |
| 2005/0257973 | A1 * | 11/2005 | Szymanski et al. | 180/68.5 |

* cited by examiner

SYSTEM AND A METHOD OF CONTROLLING THE TILTING OF A LOADCARRYING IMPLEMENT OF A MOVABLE WORK MACHINE, AND A MOVABLE WORK MACHINE

BACKGROUND AND SUMMARY

An aspect of the present invention relates to a system for controlling the tilting of a load-carrying implement of a movable work machine comprising a frame and said implement, pivo tally connected to the frame, and tilting means for tilting the implement in relation to the frame.

An aspect of the invention also relates to a movable work machine provided with such a system and to a corresponding method of tilting a load-carrying implement of a movable work machine.

An aspect of the invention is applicable to all kinds of movable work machines, or vehicles, such as loaders or lifting trucks, equipped with an implement by means of which a piece of goods of different kind is transported.

According to prior art, there are manual as well as automatic systems for tilting an implement of a work machine.

Typically the manual control systems enable a vehicle operator, depending on the specific of implement being controlled, to control lifting, tilting and tipping of the implement by way of a fluid operated system. Because such systems are manually controlled (requires good hand-eye coordination) the accuracy and consistency of implement position will vary from operator to operator and from time to time. Since a substantial amount of trial and error is required by even the most skilled operator both efficiency and accuracy of operation will suffer.

To tilt an implement, for example the goods-carrying forks of a wheel loader, to an angle required to guarantee that the goods be safely-held by the implement is difficult for even the most skilled operator. This is based on the fact that the tilted angle of the implement is an operator observed position and not based on a fixed reference. It is particularly difficult to position and maintain the implement at a desired resultant angle under the dynamics of vehicle operation since the position of the vehicle frame in relation to a given reference plane, such as the horizontal plane, normally will vary during operation and since the speed and direction of travel of the vehicle will also vary. Changes of speed and direction of travel may result in the generation of an inertia of the goods such that the latter will tend to fall off from or move in relation to the implement. In order to counteract any such motion of the goods, which in many situations might cause a hazard, the operator might occasionally need to adjust the tilting very frequently and with a lot of focus thereon, naturally resulting in less focus being put on the driving of the vehicle and the surrounding situation. In an emergency situation, in which the operator may need to break the vehicle motion as quick as possible, he may forget or not be able also to perform the necessary tilting with the required accuracy, with the result that the piece of goods falls off from the implement, thereby causing a great hazard.

Since modern work machines, like wheel loaders, may be equipped with both a conventional tilting means for tilting the implement about an axis perpendicular to the longitudinal axis of the work machine and a complementary tilting means for tilting the implement in a lateral direction, so called side-tilting, the operator needs to be very observant in order to carry out the best possible adjustment of the respective tilting at each moment. The basis of the decision-making of the operator becomes more complex, and at times he or she will inevitably be unable to take the right decision.

It is desirable to present a system and a method of controlling the tilting of an implement of a movable work machine as initially defined, by means of which a correct tilting angle of the implement is automatically set upon different operation conditions. In particular it is desirable to overcome the problems of prior art as set forth above.

According to an aspect of the invention, a system comprises control means for controlling the tilting of the implement upon basis of a sensor-registered movement of the movable work machine, and for controlling the tilting of the implement such that the implement counteracts the inertia of a load carried by the implement. Since the movement of the movable work machine, and especially the implement, in the horizontal plane, including acceleration, deceleration and lateral displacement, is the very ground for the generation of an inertia, and the acceleration, deceleration or centripetal forces acting on a load or any piece of goods carried by the implement, such control means will be decisive for the outcome of the tilting control. Preferably, the control means of an aspect of the invention should be combined with control means as of prior art for controlling the tilting of the implement with regard to a given reference plane such as the horizontal plane and with regard to the tilting of the frame of the machine or vehicle itself in relation to said reference plane. If, for example, the machine travels upwards a steep hill, a certain tilt angle of the implement is set with regard thereto, for instance so as to set a goods-carrying surface of the implement in alignment with the horizontal plane. If then the speed of the machine is suddenly and vividly decreased, the tilting means according to an aspect of the invention should see to that an adjusted positive tilting angle of the implement is set in relation to the horizontal plane in order to avoid any hazardous motion of the goods in relation to the implement. In other words, the control means should be adapted so as to tilt the goods-carrying support surface of the implement in order to inhibit the goods carried thereby from moving, e.g. sliding, in relation to said surface upon sudden change of speed of travel of the machine.

According to a preferred embodiment, the control means control the tilting of the implement upon basis of a sensor-registered movement of the movable work machine in the horizontal plane. It should be understood that, if the machine moves in a direction consisting of a vertical component and a horizontal component, the horizontal component is used as the basis for the tilting according to an aspect of the invention.

Preferably, the tilting means comprise first tilting means for tilting the implement about an axis perpendicular to a longitudinal axis of the frame, whereby the control means are adapted to control the tilting of the implement upon basis of a change of speed of the movable work machine in the horizontal plane.

Advantageously, the control means comprise a sensor for sensing the change of speed of the movable work machine in the horizontal plane, or any factor dependent on a change of speed, such as an acceleration/deceleration force on a body carried by the implement.

The control means should, preferably, comprise a control unit that, upon basis of the change of speed of the movable work machine in the horizontal plane, determines a correct implement tilt angle and controls the operation of the first tilting means in order to effectuate said correct tilt angle.

According to a preferred embodiment the tilting means comprise a second tilting means for tilting the implement in a lateral direction in relation to the frame, and means for controlling the tilting of the implement upon basis of the speed of the movable work machine and the direction of travel thereof. If, for example, the machine is travelling at a certain speed and in a certain direction of travel and the direction is altered such that it describes a curve, a certain centripetal force will act on a piece of goods carried by the implement. One way of counteracting a motion or slip-off of the goods is to side-tilt the implement. Knowledge about the speed and direction of travel will then be decisive for the result of the adjustment of the side-tilt angle.

Preferably, the control means comprise a sensor for sensing the centripetal force caused by the movement of the machine in the horizontal plane in the region of the implement. It should be emphasized that the centripetal force is directly dependent on the speed and direction of travel of the machine. Accordingly, the signal from a centripetal force sensor is also a signal based on speed and direction of travel. As an alternative to a centripetal force sensor, the second control means could comprise a speed sensor in combination with a sensor for sensing the angle of rotation of a steering wheel of the machine as well as the change and, possibly, the rate of change of said angle of rotation.

According to a first embodiment the centripetal force sensor is attached directly to the implement. Thereby, a very precise measurement of the force conditions for a piece of goods carried by the implement will be achieved. Every change of movement of the implement in the horizontal plane will be sensed by the sensor, also when the machine stands still and the movement of the implement is only due to a swinging movement of a part of the machine or due to a raising or lowering of the implement when the machine is standing on the bias, for example on a hill side.

According to a second embodiment the centripetal force sensor is attached to the frame, whereby, preferably but not necessarily, the machine comprises interpretation means for correlating the movement of the frame to the movement of the implement. In particular, the centripetal force by the frame and that one at the implement may differ. Therefore, if the sensor is positioned on the frame, an interpretation and correction with regard thereto should be carried out by the control system. By positioning the sensor on the frame, it will be easier to protect the sensor from the effects of the environment, that may be very harsh, especially in the region of the implement.

The control means should comprise a control unit that, upon basis of the speed of the machine, and the direction of travel thereof determines a correct lateral tilt angle of the implement and controls the operation of the second tilting means in order to effectuate said correct tilt angle.

Preferably, the control means determines the correct tilt angle in relation to a predetermined reference plane, preferably the horizontal plane.

The system should comprise a sensor means for sensing the tilt angle of the implement in relation to a predetermined reference plane. Knowledge about the tilt angle in relation to the reference plane will enable the system to correctly adjust the tilt angle and will tell the system when the set angle has been obtained. In other word, the tilt angle sensor means acts as a tilt angle feed-back mechanism for the control unit.

According to one embodiment, the sensor means for sensing the tilt angle of the implement is attached to the implement. Thereby, an exact information about the position of the implement with regard to a predetermined reference plane is given.

According to another embodiment, the sensor means for sensing the tilt angle of the implement is attached to the frame and, preferably but not necessarily, the machine comprises an interpretation means for correlating the tilt angle of the frame in relation to a predetermined reference plane to the tilt angle of the implement. Thereby, the sensor can be protected from the sometimes very harsh conditions prevailing in the region of the implement. The interpretation means may comprise a sensor for sensing the tilting of the implement in relation to the frame.

According to yet another embodiment, the system comprises a means by means of which an operator of the machine is able to preset said predetermined reference plane. For some reason, the operator might find it inadequate to use the reference plane predetermined by the system as the reference plane. When, for example, the centre of grayity of a piece of goods carried by the implement is such that, when placed on a horizontal plane, the piece of goods tends to be out of balance, another reference plane might, according to an aspect of the invention, be chosen by the operator.

According to a method aspect of the invention the tilt angle of the implement is controlled upon basis of a sensor-registered movement of the implement, and that the implement is tilted in order to make the latter counteract the inertia of a load carried by the implement. In other words, the tilting should be performed so as to tilt the goods-carrying support surface of the implement in order to inhibit the goods carried thereby from moving, e.g. sliding, in relation to said surface upon sudden change of, for example, speed or direction of travel of the machine.

Preferably, a change of tilt angle will be carried out upon basis of a change of the movement in the horizontal plane, for example due to an acceleration, deceleration, change of acceleration, change of deceleration, lateral displacement, movement along a curvature, etc. In other words, any movement in the horizontal plane that will result in a horizontal force acting on a load carried by the implement and promoting a change of position of the load in relation to the implement will be registered, and will form the basis upon which a correct tilt angle of the implement is set or calculated.

Preferably, the tilting of the implement is controlled upon basis of a change of speed of the movable work machine in the rearward or forward direction thereof, said tilting being performed about an axis perpendicular to a longitudinal axis of the machine.

According to a preferred embodiment the tilting of the implement is controlled automatically upon basis of the speed of the movable work machine and the direction of travel thereof, said tilting being performed in a lateral direction in relation to the longitudinal axis of the machine.

In all embodiments of the invention, it should be understood that the implement forms a part of the movable work machine. It has been stated that it is the movement, speed, direction of travel, or changes thereof, of the machine that forms the basis for the setting or calculation of the tilt angle. However, it should be understood that, preferably, it is the movement, speed, direction of travel, etc. of the implement that forms the basis of such setting or calculation. This is particularly relevant for those cases when there is a movement of the implement in the horizontal plane, but when the frame of the machine stands still.

It should be mentioned that, if any sensor is located on the frame, the need of any interpretation means will depend on the distance between sensor and implement. If, for example, the sensor is located on an implement holder directly attached to the implement, the sensor could as well be regarded as located on the implement itself, since the movement of the implement holder might be very similar to the movement of the implement.

Further features and advantages of an aspect of the present invention will be disclosed in the following detailed description.

BRIEF DESCRIPTION OF THE DRAWINGS

Preferred embodiments will now be described, by way of example, with reference to the annexed drawings, on which.

DETAILED DESCRIPTION

Figure 1:
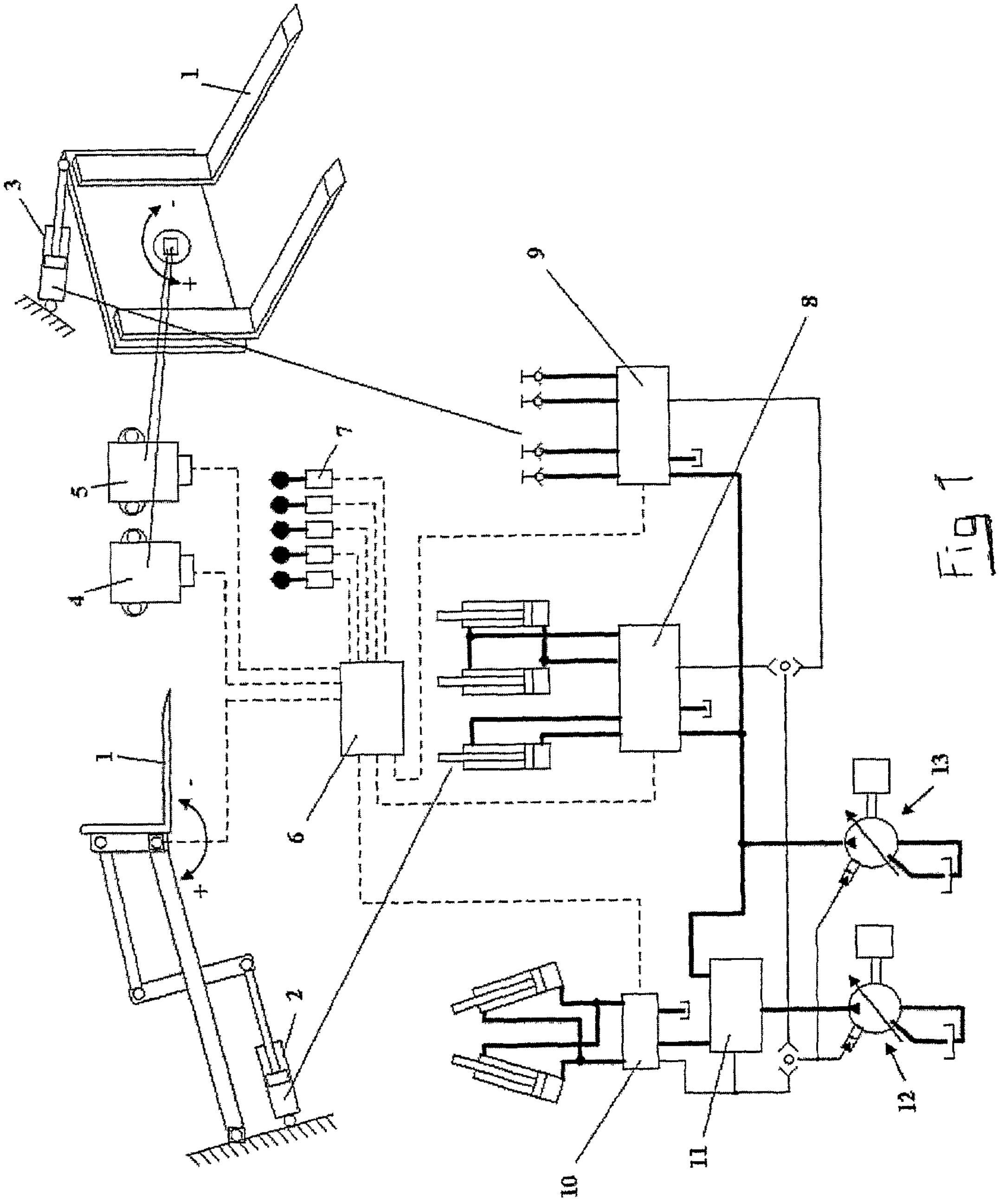
FIG. 1 is a schematic representation of a first embodiment of a system according to an aspect of the invention.

FIG. 1 shows a representation of a system according to an aspect of the invention, preferably applied to a work machine such as a fork truck or a wheel loader (not shown), adapted to be driven in a forward or rearward direction and equipped with an implement 1 such as a lifting fork or a bucket.

The work machine further comprises a means 2 for tilting the implement 1 about a first axis perpendicular to a longitudinal direction of the work machine. It also comprises a means 3 for side-tilting the implement 1 about a second axis perpendicular to said first axis. The second axis extends in the same vertical plane as the longitudinal axis of the work machine or a in plane parallel thereto.

Moreover, the system for controlling the tilting of the implement 1 comprises a first sensor 4 for sensing the tilting of the implement 1 about the first axis and in relation to a reference plane, and about the longitudinal axis and in relation to a reference plane. Preferably, the reference plane is the horizontal plane. In the embodiment according to FIG. 1, the first sensor 4 is attached directly to the implement 1.

The system also comprises a second sensor 5 for sensing a force accomplished by the acceleration, deceleration or change of direction of travel of the implement 1 in the horizontal plane. In other words, the sensor 5 senses a change of the movement of the machine in its forward or rearward directions. The second sensor 5 may be constituted by any suitable centripetal force sensor capable of sensing the force in a lateral direction as well as in the longitudinal direction. It may, alternatively, comprise individual sensors for sensing the lateral and longitudinal acceleration forces respectively. In the embodiment of FIG. 1, the second sensor 5 is directly attached to the implement 1.

Moreover, the work machine comprises a control unit 6 that, upon basis of the change of speed of the machine, determines a correct implement tilt angle and controls the operation of the first tilting means 2 in order to effectuate said correct tilt angle. For this purpose the control means 6 may be equipped by any suitable software or logic circuit necessary for carrying out such a control. The control unit 6 is also adapted to, upon basis of the speed of the machine and the direction of travel thereof, determine a correct lateral tilt angle of the implement 1 and control the operation of the second tilting means 3 in order to effectuate said correct lateral tilt angle. A suitable software or logic circuit should be provided for this purpose.

The work machine further comprises a plurality of controls 7 by means of which the operator is supposed to operate the machine. According to an aspect of the invention there is one such control 7 by means of which the operator is able to preset the reference plane in relation to which the control unit 6 is to set the correct tilt angle and lateral tilt angle. In absence of such presetting by the operator, the reference plane will be predetermined by the control unit 6 itself, and will normally be the horizontal plane.

An aspect of the invention is based on the idea of using a system with electrically controlled hydraulics, some elements of which are schematically shown in the figures. Accordingly, the work machine comprises a system in which there is a first valve 8 for regulating the flow of a hydraulic medium to the first tilting means 2, and a second valve 9 for regulating the flow of a hydraulic medium to the second tilting means 3 upon order from the control unit 6. There is also a third valve 10 for regulating the flow of a hydraulic medium to a steering mechanism (not shown) of the work machine, as well as a fourth valve 11 which has as its task to prioritise the use of the hydraulic medium for the steering function before the other work functions of the machine if necessary. Moreover, the machine comprises a pump 12 for pumping the hydraulic medium to the first, second, third and fourth valves 8-11, as well as a pump 13 primarily adapted for pumping the hydraulic medium only to the first and second valves 8, 9.

According to one aspect of the invention, the signals from the sensor means 4 and 5 are transmitted to the control unit 6. The latter calculates the correct tilt angle of the implement in relation to the frame of the machine in order to achieve a correct tilt angle of the implement in relation to the reference plane, which might be the horizontal plane. Normally, the support plane of the implement should be co-planar with the horizontal plane. This basic function can be carried out by means of only the tilting sensor means 4 and the control unit 5. If however, there is an acceleration or deceleration of the forward or rearward motion of the machine, the acceleration/deceleration sensor means 5 will transmit information thereabout to the control unit 6, and a further correction of the tilt angle and lateral tilt angle will be carried out. This is carried out by means of the signal transmission from the control unit 6 to the first and second valves 8 and 9 respectively. If there is also a turning motion of the machine, by which a centripetal force is generated upon the load carried by the implement 1, the acceleration/deceleration means 5 will transmit information thereabout to the control unit 6 which, in its turn, will calculate a new correct tilt angle upon bases thereof and will control the operation of the first and second valves 8, 9 in accordance therewith.

Figure 2:
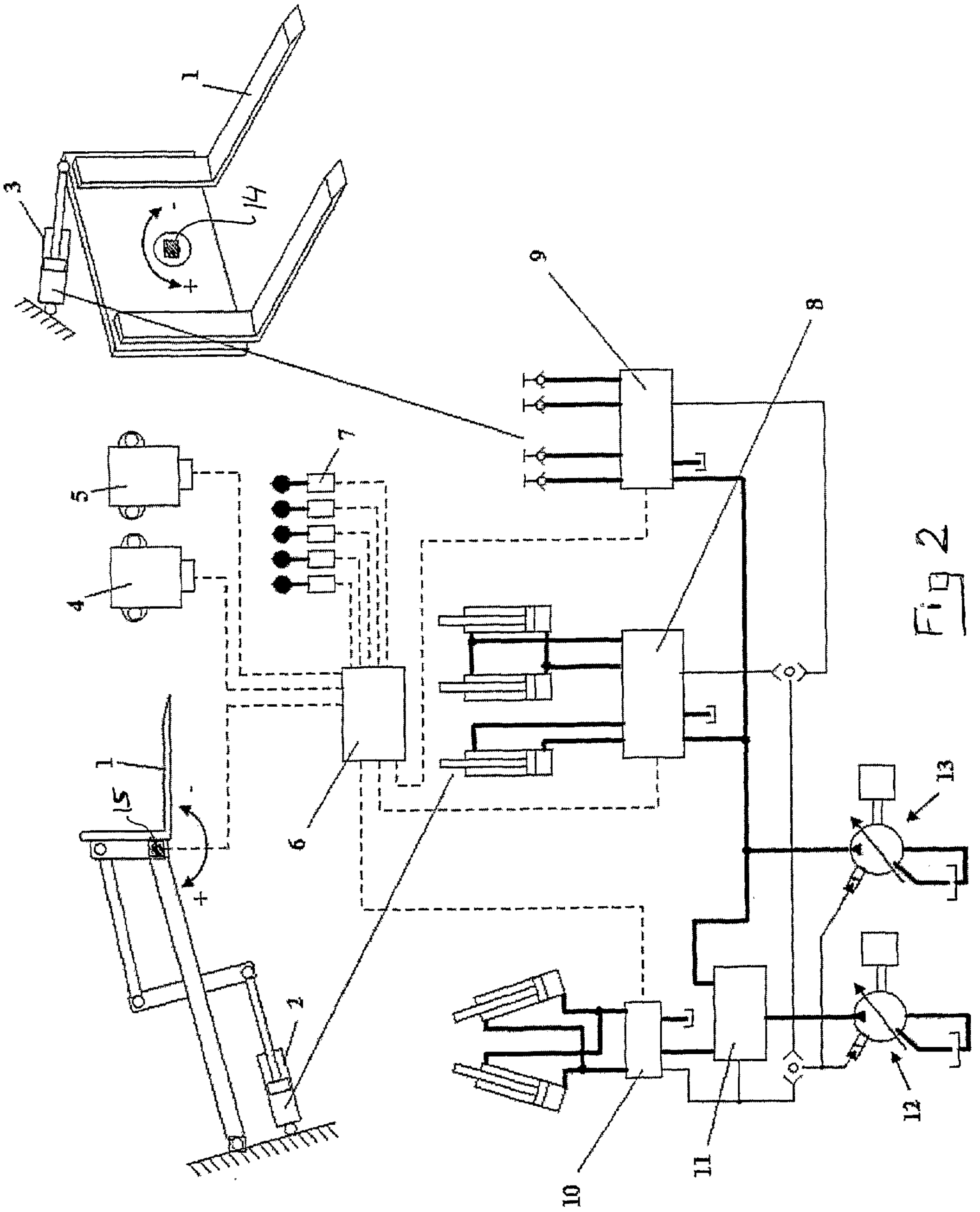
FIG. 2 is a schematic representation of a second embodiment of a system according to an aspect of the invention.

The embodiment shown in FIG. 2 differs from the one of FIG. 1 only with regard to the positioning of the sensor means 4 and 5. The sensor means 4 for sensing the tilt angle in relation to a predetermined reference plane is directly connected to the frame of the machine. Therefore, in order to compensate for the difference in tilting between the frame and the implement 1, the machine comprises interpretation means 14, 15 for correlating the tilt angle of the frame in relation to the tilt angle of the implement 1. The interpretation means 14, 15 comprise a sensor 14 for sensing the side tilt angle of the implement in relation to the frame, and a sensor 15 for sensing the tilt angle about the first axis in relation to the frame.

Also the second sensor means 5 is attached to the frame of the machine. Therefore, in order to compensate for the difference in acceleration and centripetal force conditions between the region of the frame where the sensor 5 is located and the region of the implement 1, the machine should comprise an interpretation means for correlating the acceleration and centripetal force conditions of the relevant region of the frame in relation to the ones of the region of the implement 1. Such interpretation means may comprise suitable software or logic circuit, preferably arranged in the control unit 6.

It should be understood that, for a person skilled in the art, a plurality of alternative embodiments will be obvious, without however going beyond the scope of the invention as defined by the annexed patent claims supported by the description and the drawings.

The invention claimed is:

1. A wheel loader comprising:

a system for controlling tilting of a load-carrying implement of the wheel loader, a frame, the implement, the implement being pivotally connected to the frame, and tilting means for tilting the implement in relation to the frame, the system comprising control means for controlling tilting of the implement such that the implement counteracts inertia of a load carried by the implement, wherein the tilting means comprises first tilting means for tilting the implement about an axis perpendicular to a longitudinal axis of the frame and second tilting means for tilting the implement in a lateral direction in relation to the frame, the control means controlling lateral and longitudinal tilting of the implement based upon a sensor-registered movement of the wheel loader, the speed of the wheel loader in the horizontal plane and a direction of travel of the wheel loader in the horizontal plane.

2. The wheel loader according to claim 1, wherein the control means is adapted to control the tilting of the implement based upon a change of speed of the wheel loader in a horizontal plane.

3. The wheel loader according to claim 2, wherein the control means comprises a sensor for sensing the change of speed of the wheel loader in the horizontal plane.

4. The wheel loader according to claim 3, wherein the control means comprises a control unit that, based upon the change of speed of the wheel loader in the horizontal plane, determines a correct implement tilt angle and controls operation of the first tilting means in order to effectuate the correct tilt angle.

5. The wheel loader according to claim 1, wherein the means for controlling the tilting: of the implement comprises a sensor for sensing centripetal force caused by movement of the wheel loader in a region of the implement.

6. The wheel loader according to claim 5, wherein the centripetal force sensor is attached directly to the implement.

7. The wheel loader according to claim 5, wherein the centripetal force sensor is attached to the frame, and the wheel loader comprises interpretation means for correlating movement of the frame to movement of the implement.

8. The wheel loader according to claim 1, wherein the control means comprises a control unit that, based upon the speed of the wheel loader and the direction of travel of the wheel loader e determines a correct lateral tilt angle of the implement and controls the operation of the second tilting means in order to effectuate the correct tilt angle.

9. The wheel loader according to claim 1, wherein the control means determines a correct tilt angle in relation to a predetermined reference plane.

10. The wheel loader according to claim 9, comprising sensor means for sensing the tilt angle of the implement in relation to a predetermined reference plane.

11. The wheel loader according to claim 10, wherein the sensor means for sensing the tilt angle of the implement is attached to the implement.

12. The wheel loader according to claim 10, wherein the sensor means for sensing the tilt angle of the implement is attached to the frame and the wheel loader comprises interpretation means for correlating the tilt angle of the frame in relation to a predetermined reference plane to the tilt angle of the implement.

13. The wheel loader according to claim 10, comprising means permitting an operator of the wheel loader to preset the predetermined reference plane.

14. A method of controlling tilting of a load-carrying implement on a wheel loader comprising a frame and the implement pivotally connected to the frame, and means for tilting the implement in relation to the frame, comprising registering, movement of the implement with a sensor so as to determine a change of speed of the wheel loader in a rearward or forward direction and a speed and direction of travel of the wheel loader in a horizontal plane;

controlling a longitudinal and a lateral tilt angle of the implement in response to the sensor-registered movement of the implement so that the implement counteracts inertia of a load carried by the implement, wherein longitudinal tilting of the implement is controlled based upon the change of speed of the wheel loader in the rearward or forward direction of the wheel loader, the tilting being performed about an axis perpendicular to a longitudinal axis of the wheel loader, and wherein tilting of the implement is controlled based upon the speed and the direction of travel of the wheel loader in the horizontal plane, the tilting being performed in a lateral direction in relation to a longitudinal axis of the wheel loader.

15. A method according to claim 14, wherein a tilt angle of the implement is controlled based upon a sensor-registered movement of the implement in horizontal plane.

* * * * *